(12) United States Patent
Loesenbeck

(10) Patent No.: US 8,193,712 B2
(45) Date of Patent: Jun. 5, 2012

(54) METHOD FOR MONITORING A PLURALITY OF ELECTRICAL LUMINOUS ELEMENTS AND DEVICE FOR DISINFECTING A SUBSTANCE BY MEANS OF ULTRAVIOLET RADIATION

(75) Inventor: Jan Boris Loesenbeck, Bielefeld (DE)

(73) Assignee: Xylem IP Holdings LLC, White Plains, NY (US)

( * ) Notice: Subject to any disclaimer, the term of this patent is extended or adjusted under 35 U.S.C. 154(b) by 468 days.

(21) Appl. No.: 12/446,676

(22) PCT Filed: Aug. 7, 2007

(86) PCT No.: PCT/EP2007/006970
§ 371 (c)(1),
(2), (4) Date: Jul. 29, 2009

(87) PCT Pub. No.: WO2008/049476
PCT Pub. Date: May 2, 2008

(65) Prior Publication Data
US 2010/0000925 A1    Jan. 7, 2010

(30) Foreign Application Priority Data
Oct. 23, 2006   (DE) .......................... 10 2006 050 276

(51) Int. Cl.
*H05B 37/02* (2006.01)
(52) U.S. Cl. .............................. 315/56; 315/59; 315/229
(58) Field of Classification Search ............. 210/748.01, 210/748.1, 748.08, 748.09; 315/56, 58, 59, 315/60, 61, 363, 227 R, 228, 229, 233, 234, 315/235, 240
See application file for complete search history.

(56) References Cited

U.S. PATENT DOCUMENTS

| 4,103,167 | A | 7/1978 | Ellner |
| 4,471,225 | A | 9/1984 | Hillman |
| 5,368,826 | A | 11/1994 | Weltz |
| 6,316,877 | B1* | 11/2001 | Kaas ................................ 315/56 |
| 6,593,704 | B2* | 7/2003 | Riepe et al. ................... 315/224 |
| 2009/0120882 | A1* | 5/2009 | Voronov et al. ............... 210/748 |

FOREIGN PATENT DOCUMENTS

| DE | 28 25 672 A1 | 12/1979 |
| EP | 0608061 | 7/1994 |
| WO | WO 2005/019782 | 3/2005 |

* cited by examiner

*Primary Examiner* — David Hung Vu
(74) *Attorney, Agent, or Firm* — RatnerPrestia

(57) ABSTRACT

The invention relates to a method for the monitoring of a plurality of at least three electrical lighting bodies of the same design, comprising
a. Imposition on the plurality of lighting bodies of at least one supply signal from at least one ballast device,
b. Reading out of at least one parameter for each of the individual lighting bodies in each case,
c. Forming of at least one reference value from at least some of the parameters read out from the different lighting bodies,
d. Comparison of the reference value with the parameter of each individual one of the lighting bodies,
e. Generation of a signal for each lighting body of which the parameter exceeds a specified deviation from the reference value.

24 Claims, 2 Drawing Sheets

METHOD FOR MONITORING A PLURALITY OF ELECTRICAL LUMINOUS ELEMENTS AND DEVICE FOR DISINFECTING A SUBSTANCE BY MEANS OF ULTRAVIOLET RADIATION

CROSS REFERENCE TO RELATED APPLICATIONS

This application is the U.S. national phase application of PCT International Application No. PCT/EP2007/006970, filed Aug. 7, 2007, which claims priority to German Patent Application No. 102006050276.0, filed Oct. 23, 2006, the contents of such applications being incorporated by reference herein.

BACKGROUND OF THE INVENTION

Field of the Invention

The invention relates to a method for the monitoring of a plurality of electrical lighting bodies and to a device for the disinfection of a substance by means of ultraviolet radiation.

In the field of disinfection of water, such as drinking water, waste water, swimming pool water, or the like, installations are known in which a plurality of UV gas discharge tubes of the same design are operated simultaneously. Depending on the size of the system, this may involve any number from a few tubes to more than 10,000 tubes. Large systems of the latter type are used, for example, to kill off micro-organisms used for the clarification of waste water after the corresponding clarification step. The UV tubes used are cost-intensive and it is therefore desirable for their service life to be optimised. On the other hand, it is often not expedient, when operating such a system, to wait until a tube fails completely, since its performance capacity will already start to diminish beforehand due to a large number of possible effects. Moreover, in the field of disinfection and killing off of micro-organisms in particular the full functional performance of the system must be guaranteed without fail at all times.

It has been shown that the present operational parameters of a lighting body, in particular in use in a system for water disinfection, do not provide any very reliable points of reference for the functional state of the light body. This is due, inter alia, to the substantial fluctuation range of these operational parameters as a function of external influences, such as the water temperature, the flow rate of the water, etc.

The object of the invention is to provide a method for the monitoring of a plurality of at least three electric lighting bodies of the same design and a device for the disinfection of a substance by means of ultra-violet radiation, in which the exploitation of the service life of the individual lighting bodies can be individually optimised.

This object is resolved for a method for the monitoring of a plurality of electrical lighting bodies. By comparison of a parameter of one individual lighting body with a reference value, which is formed from at least some of the parameters of the other lighting bodies, an indication can be gained of the functional state of the lighting body, which is largely independent of external influences, inasmuch as these influences essentially have the same effect on all the lighting bodies. This relates in particular to the operating temperature of the lighting bodies, which is influenced by external conditions. If one of the lighting bodies deviates sufficiently clearly with its parameter from the reference value formed by a large number of lighting bodies, a corresponding signal is then generated. This signal can lead to an immediate replacement of the lighting body. Depending on the size of the system and on further information as appropriate, however, provision can also be made in the first instance for several signals to be gathered, or further monitoring routines to be initiated. With an adequate number of lighting bodies and an adequate scatter of the individual service lives, as well as appropriately frequent repetition of the method steps, the probability is negligible that several lighting bodies will show a correspondingly large deviation in their parameters at the same time, with the result that the generation of a false signal is improbable.

In a preferred embodiment, the reference value is simply a mean value of the parameters.

The reference value can in particular be formed from all the parameters which are read out. With a sufficiently large number of lighting bodies, of which at least the majority are in a good operational condition, an optimum mean operational value of the lighting bodies can in this way be statistically approximated. In particular in the case of a small number of lighting bodies, however, the deviation of a lighting body can already decisively influence the reference value. In this case, provision can be preferably made for the reference value in each case to be formed without the involvement of the parameter to be compared with the reference value in step c).

Generally advantageously, the steps b. to e. are repeated, in particular at the same time intervals. The duration of the repetition in this situation is advantageously substantially smaller than the mean service life of a lighting body and in particular advantageously smaller than the mean deviation of the service lives of different lighting bodies.

In a preferred further embodiment, the parameter for each of the lighting bodies is read out several times over a period of time and stored, wherein a temporal course of the parameters and of the reference value can be determined. As a result of this, in particular, a speed of change of the parameter can be determined advantageously, which under certain circumstances can provide important information. For example, with UV gas discharge tubes which contain Amalgam, there may occasionally be cases of accumulations of Amalgam dripping off, which causes a very abrupt change in the operating parameters of the tubes. The absolute change of the parameter in question may in this case lie entirely in the tolerable range, wherein the high speed in the change in the signal will nevertheless identify this lighting body as one which is to be replaced, at least within the framework of the next routine maintenance procedure. In another example, the time period can lie in the range of the adjustment of a thermal equilibrium after the system has been switched on. Lighting bodies functioning normally have in each case a similar period of time to reach thermal equilibrium, wherein this period of time may depend substantially on the environmental influences. Lighting bodies which, for example, exhibit attenuation and therefore a reduction in their radiation capacity emitted to the outside, regularly have a significantly deviating period of time needed to attain their thermal equilibrium. Apart from this, such a lighting body may appear entirely normal in terms of its other operating parameters when it is in thermal equilibrium. Furthermore, short-term behaviour of the lighting body could be measured and compared with the reference value formed from the other lighting bodies. Such short-term behaviour could be, for example, an abrupt response by operating parameters to, for example, an instantaneous change in the supply voltage. Abrupt responses which deviate perceptibly from the reference value can be an early indicator for the identification of a lighting body which is damaged or nearing the end of its service life. In principle, the terms "parameter" and "reference value" of the method according to the invention are also understood to mean differentiated assessment of such a response curve or, generally, a quantity of values acquired over a period of time.

In a preferred embodiment, the supply signal for the ballast device is regulated as a function of a reference value. Conventional UV gas discharge tubes are frequently operated in this manner. For example, the lighting body can be regulated to a constant current strength as a reference value, wherein the supply signal or a supply voltage respectively is the value which is to be regulated. In this situation, the parameter of the lighting body is derived advantageously from the supply signal imposed on it. In a simple manner, the parameter is an effective supply voltage of the lighting body. With an easily realisable and reliable embodiment of the method according to the invention, the reference value is a mean value of the effective supply voltages of the lighting bodies, wherein the specified deviation is not more than some 10%, in particular some 5%, from the mean value.

In a particularly preferred embodiment, the reference value is an effective current strength of one or more of the lighting bodies. As an alternative, the reference value can also be an electrical performance value of one or more lighting bodies.

In an embodiment which can be favourably realised, the supply signal is regulated by means of a pulse width modulation. Preferably, in this situation an effective supply voltage can be adjusted by a pulse duty factor of the supply signal, wherein the supply signal is in particular a square-wave voltage of constant amplitude. Such a control of the supply signal can be achieved in a particularly simple and economical manner by means of digital electronics in ballast devices.

In a preferred embodiment, the lighting bodies are in each case gas discharge tubes. Gas discharge tubes are expensive and have relatively complex behaviour over the course of their life. They are also considerably sensitive with regard to their operating parameters in respect of external influences, such as the ambient temperature, so that the method according to the invention can be combined advantageously in a particular manner with gas discharge tubes.

By implementing the method according to the invention, operating costs and operational reliability can be optimised particularly effectively if the plurality of lighting bodies comprises at least 10, and in particular at least 100 lighting bodies. In principle, however, the method can already be applied with three separate lighting bodies of the same design, since, on the assumption that two of the three lighting bodies are in a reference condition, the deviation of the third can be unambiguously determined.

In an advantageous embodiment, a ballast device, in the sense of an independent supply signal, is allocated to each lighting body. In principle, one ballast device can also operate all or a sub-group of the plurality of lighting bodies. For example, then a constant total current of the lighting bodies operated by the ballast device can be regulated. In order to be able to read out the parameters of individual lighting bodies in such an arrangement, an individual measurement is regularly required, for example of the supply voltage of the individual lighting bodies. If a separate ballast device in the sense of a separated supply voltage is allocated to each lighting body, then the supply voltage or another operational parameter can be read out directly from the ballast device, for example via a digital bus system. The separation of the supply signal in this sense is to be understood such that the individual ballast devices of the different lighting bodies can be readily integrated in a common housing or on a printed circuit board. The only important factor is the separation of the supply signals of the lighting bodies.

The object of the invention is resolved for a device for the disinfection of a substance by means of ultra-violet radiation. By implementing any one of the claimed methods on a process computer of a device for the disinfection of a substance, on the one hand the service lives of the individual lighting bodies can be utilised to the optimum and, on the other, the optimum function of the device can be assured.

In a preferred embodiment, ozone is produced by the ultra-violet radiation of the lighting bodies, wherein the disinfection of the substance is effected at least in part by the ozone which is produced. With particularly suitable devices, the substance is water, in particular waste water or drinking water. With such systems, the lighting bodies are regularly subjected to substantial thermal influence due to the water. Changes in the water temperature or also the flow rate influence the lighting bodies so perceptibly, in particular in the case of gas discharge tubes, that a comparison of current operational parameters with fixed reference values is not reliable. Accordingly, the dynamic determination of reference values according to the method according to the invention and implemented in the device achieves particularly good results.

In a particularly advantageous embodiment, the parameters of the lighting bodies can be read out by means of a bus system of the at least one ballast device. This allows for an economical and simple combination of conventional ballast devices with a process computer.

Further advantages and features of the invention result from the embodiment described hereinafter, as well as from the dependent claims.

DESCRIPTION OF THE DRAWINGS

Two preferred embodiments of the device according to the invention are described below and explained in greater detail on the basis of the appended drawings.

DETAILED DESCRIPTION OF THE INVENTION

Figure 1:
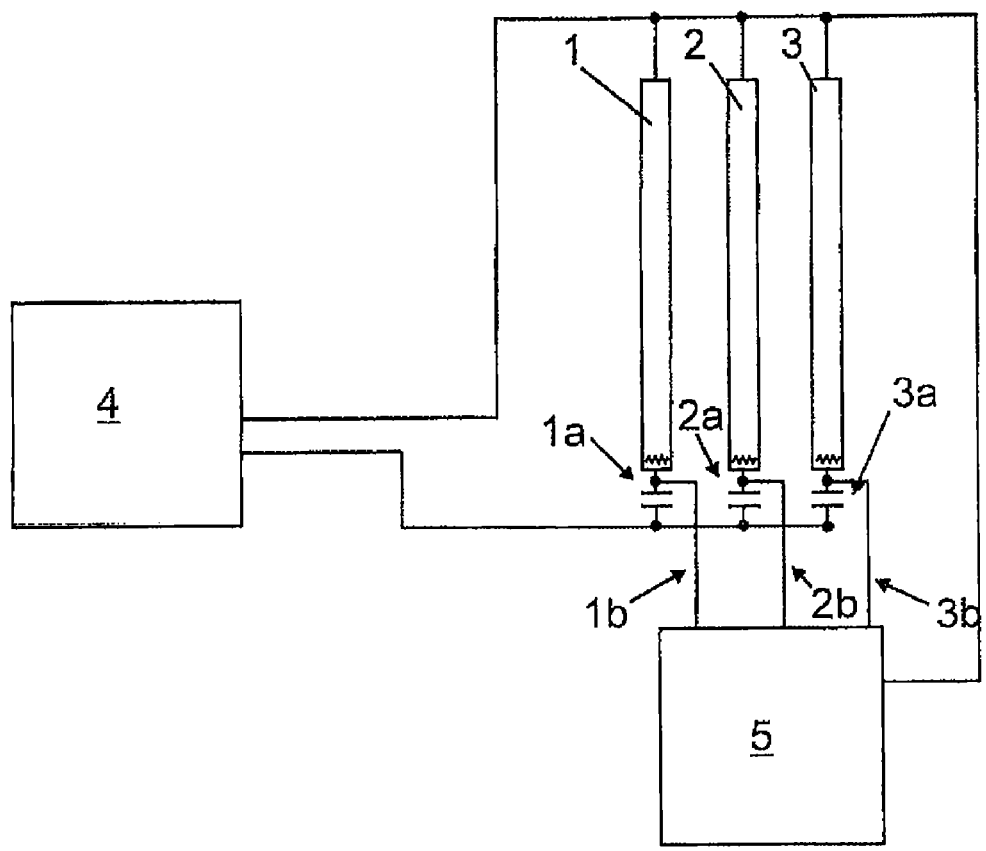
FIG. 1 shows a diagrammatic representation of a first embodiment of a device according to the invention.

The first embodiment according to FIG. 1 comprises three UV gas discharge tubes 1, 2, 3, which are operated by means of a common ballast device 4. Connected upstream of each of the tubes 1, 2, 3 is a capacitor, 1*a*, 2*a*, 3*a*, in series. A separate measurement line 1*b*, 2*b*, 3*b* branches off from each of the tubes 1, 2, 3, from their contact points on the capacitor side, and leads to a process computer 5. As a result, each individual supply voltage from the three tubes can be read out by the process computer 5, for which purpose the process computer 5 comprises an appropriate measurement interface.

The ballast device 4 dispenses, as the supply voltage, a square-wave AC voltage of variable pulse duty factor. An effective supply voltage is defined as a temporal mean value of the amount of the AC voltage, such that the effective voltage can be adjusted via the pulse duty factor.

An effective current, i.e. a current which is temporally determined, is kept at a constant reference value by means of the ballast device, wherein the pulse duty factor of the voltage is the regulated value. If, for example, each of the gas discharge tubes 1, 2, 3 of the same design has a nominal operating current of 1 Ampere, then the ballast device regulates to a constant total current of 3 Amperes.

With the three tubes in the normal state, accordingly largely the same operating voltages result for each of the individual tubes. If one of the tubes is nearing the end of its service life, its operating voltage value, which is read out via one of the lines 1b, 2b, 3b, will deviate from the operating voltage values of the two other tubes. At time intervals which are substantially shorter than the operating duration of the tubes (e.g. once per minute), the process computer 5 reads out the effective operating voltages of the three tubes. What is important is that the three operating voltages are read out essentially simultaneously, in order to exclude influences from changing environmental parameters. The three tubes 1, 2, 3 of the device from FIG. 1 are arranged in a water disinfection system and have water constantly flowing around them, which can change its flow rate or temperature.

After reading out a trio of effective voltages as parameters of the three tubes 1, 2, 3, a mean value is formed from the three voltage values. The process computer then compares this mean value with each individual voltage of the three. If one of the three voltages deviates by more than 5% from the mean value or reference value, the process computer 5 then generates a signal which indicates the peculiarity affecting the tubes concerned.

TABLE 1

|  | $U_{eff1}$ [V] | $U_{eff2}$ [V] | $U_{eff3}$ [V] |
| --- | --- | --- | --- |
| $T_{Wasser}$ = 5° C. | 90.7 | 92.5 | 92.4 |
| $T_{Wasser}$ = 30° C. | 93.1 | 94.8 | 95.1 |

Table 1 shows a specific example of measured values from three gas discharge tubes. In each case regulation takes place at constant current, wherein the three radiator units or tubes 1, 2, 3 in each case have measured effective voltages $U_{eff1}$, $U_{eff2}$, $U_{eff3}$. In this example, a voltage from the first tube 1 which is too low shows, lying just 2% below the mean voltage of the two other tubes. The measured values were in each case taken at a water temperature of 5° C. and 30° C. Through this temperature difference, a similar change in the voltage values can be seen to be taking effect, in the same way as it corresponds to the deviation of the tube 1 from the other tubes 2, 3.

Figure 2:
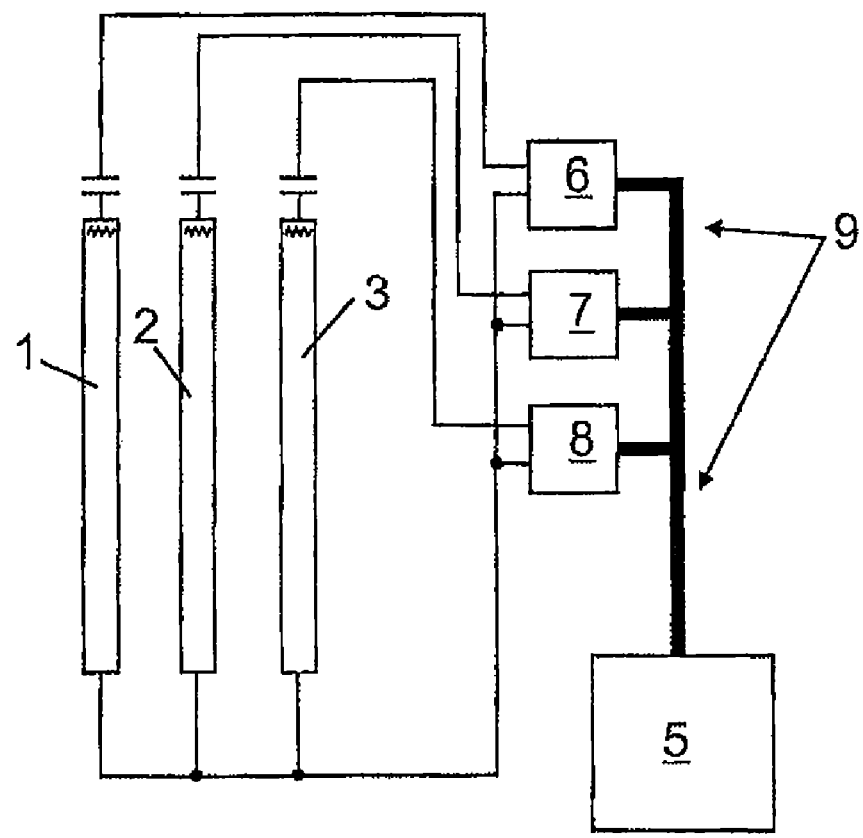
FIG. 2 shows a diagrammatic representation of a second embodiment of a device according to the invention.

With the second embodiment according to FIG. 2, individual ballast devices 6, 7, 8 are allocated in each case to the three tubes 1, 2, 3. Each of the ballast devices 6, 7, 8 regulates each of the three tubes 1, 2, 3, separately at the same constant current, wherein in the first embodiment the voltage is a square-wave AC voltage with variable pulse duty factor. The ballast devices 6, 7, 8 are set up with the aid of digital electronics, and are provided with a bus system 9, by means of which they are switched and can be actuated. By means of the bus system 9, a process computer 5 reads out the effective supply voltages regulated for the individual tubes 1, 2, 3, which can be determined from ballast devices 6, 7, 8, without additional measurement lines being required at the tubes. These values are drawn upon, as described above, to form a dynamic reference value, wherein exceeding a deviation of 5% of the effective voltage from the reference value leads to the generating of a signal for the tube affected in each case.

The method according to the invention and the device according to the invention are in particular suited for three or more tubes of the same design. In the diagrammatic embodiments, only three tubes were represented; in general, however, more tubes are clearly used, in particular in large systems for the disinfection of drinking water and/or waste water.

The invention claimed is:

1. Method for the monitoring of a plurality of at least three electrical lighting bodies of the same design comprising:
   a. Imposition on the plurality of lighting bodies of at least one supply signal from at least one ballast device,
   b. Reading out of at least one parameter for each of the individual lighting bodies in each case,
   c. Forming of at least one reference value from at least some of the parameters read out from the different lighting bodies,
   d. Comparison of the reference value with the parameter of each individual one of the lighting bodies,
   e. Generation of a signal for each lighting body of which the parameter exceeds a specified deviation from the reference value.

2. Method according to claim 1, wherein the reference value is a mean value of the parameters.

3. Method according to claim 1, wherein the reference value is formed from all the parameters which are read out.

4. Method according to claim 1, wherein the reference value is formed in each case without the involvement of the parameter to be compared with the reference value in step c.

5. Method according to any claim 1, wherein the steps b. to e. are repeated, in particular at the same time intervals.

6. Method according to claim 5, wherein the parameter for each of the lighting bodies is read out several times over a period of time and stored, wherein a temporal course of the parameters and of the reference value can be determined.

7. Method according to any claim 1, wherein a signal is generated for a lighting body if a temporal change in the deviation of its parameter from the reference value exceeds a set limit value.

8. Method according to claim 1, wherein the supply signal of the ballast device is regulated as a function of a reference value.

9. Method according to claim 8, wherein the parameter of a lighting body is determined from the supply signal imposed on it.

10. Method according to claim 9, wherein the parameter is an effective supply voltage ($U_{eff1}$, $U_{eff2}$, $U_{eff3}$) of the lighting body.

11. Method according to claim 10, wherein the reference value is a mean value of the parameters of the lighting bodies, wherein the specified deviation is not more than some 10%, and in particular some 5%, from the mean value.

12. Method according to claim 8, wherein the reference value is an effective current strength of one or more lighting bodies.

13. Method according to claim 8, wherein the reference value is an electrical capacity of one or more lighting bodies.

14. Method according to claim 8, wherein the supply signal is regulated by a pulse width modulation.

15. Method according to claim 14, wherein an effective supply voltage can be adjusted by means of a pulse duty factor of the supply signal, wherein the supply signal is, in particular, a square-wave voltage of constant amplitude.

16. Method according to claim 1, wherein the lighting bodies are in each case gas discharge tubes.

17. Method according to claim 1, wherein the plurality of lighting bodies comprises at least ten and in particular at least one hundred lighting bodies.

18. Method according to claim 1, wherein a ballast device is allocated to each of the lighting bodies in the sense of an independent supply signal.

19. Device for the disinfection of a substance by means of ultra-violet radiation, comprising
    a plurality of lighting bodies, in particular gas discharge tubes, for the production of ultra-violet radiation,
    at least one ballast device for the imposition on the lighting bodies of a supply signal, and a process computer with a programmed control program on it, wherein the control program comprises a method for the monitoring of the plurality of lighting bodies according to claim 1.

20. Device according to claim 19, wherein ozone is produced by the ultra-violet radiation, wherein the disinfection of the substance takes place at least in part by way of the ozone which is produced.

21. Device according to claim 19, wherein the substance is water, in particular waste water or drinking water.

22. Device according to claim 21, wherein the water is in thermal contact with the lighting bodies.

23. Device according to claim 19, wherein the lighting bodies are gas discharge tubes.

24. Device according to claim 19, wherein the parameters of the lighting bodies can be read out by way of a bus system of the at least one ballast device.

* * * * *